(12) United States Patent
Roerig et al.

(10) Patent No.: US 10,688,593 B2
(45) Date of Patent: Jun. 23, 2020

(54) ADDITIVE MANUFACTURED COMPONENT WITH ENLARGED WIDTH AREA IN CHANNEL AT MELTING BEAMS' FIELD INTERFACE

(71) Applicant: General Electric Company, Schenectady, NY (US)

(72) Inventors: Felix Martin Gerhard Roerig, Baden (CH); Donnell Eugene Crear, Simpsonville, SC (US); Juan Vicente Haro Gonzalez, Zurich (CH); Mikhail Pavlov, Dietikon (CH); Dean Andrew Snelling, Jr., Greenville, SC (US)

(73) Assignee: General Electric Company, Schenectady, NY (US)

( * ) Notice: Subject to any disclaimer, the term of this patent is extended or adjusted under 35 U.S.C. 154(b) by 380 days.

(21) Appl. No.: 15/626,413

(22) Filed: Jun. 19, 2017

(65) Prior Publication Data

US 2018/0361502 A1    Dec. 20, 2018

(51) Int. Cl.
*B22F 3/00*     (2006.01)
*B23K 26/06*    (2014.01)
*B23K 26/342*   (2014.01)
*B33Y 30/00*    (2015.01)
*B33Y 80/00*    (2015.01)
(Continued)

(52) U.S. Cl.
CPC ........ *B23K 26/0608* (2013.01); *B22F 3/1055* (2013.01); *B22F 5/10* (2013.01); *B23K 15/004* (2013.01); *B23K 15/0006* (2013.01); *B23K 15/0086* (2013.01); *B23K 15/0093* (2013.01); *B23K 15/06* (2013.01); *B23K 26/0006* (2013.01); *B23K 26/0604* (2013.01); *B23K 26/082* (2015.10); *B23K 26/123* (2013.01); *B23K 26/127* (2013.01); *B23K 26/342* (2015.10); *B33Y 30/00* (2014.12); *B33Y 50/02* (2014.12); *B33Y 80/00* (2014.12); *B22F 2003/1057* (2013.01); *B23K 2101/001* (2018.08); *B23K 2103/26* (2018.08); *B33Y 10/00* (2014.12)

(58) Field of Classification Search
None
See application file for complete search history.

(56) References Cited

U.S. PATENT DOCUMENTS

2015/0266092 A1    9/2015  Andersson et al.
2016/0114432 A1*   4/2016  Ferrar ............... B23K 26/082
                                              219/76.12

* cited by examiner

*Primary Examiner* — Seth Dumbris
*Assistant Examiner* — Kim S. Horger
(74) *Attorney, Agent, or Firm* — James Pemrick; Hoffman Warnick LLC

(57) ABSTRACT

A component includes a body, and an interface in the body defining a first and second portion of the body made by different melting beam sources of a multiple melting beam source additive manufacturing system during a single build. The component also includes a channel extending through the body. The channel includes an interface-distant area on opposing sides of the interface, each interface-distant area having a first width. The channel also includes an enlarged width area fluidly communicative with the interface-distant areas and spanning the interface, the enlarged width area having a second width larger than the first width. Any misalignment of the melting beams at the interface is addressed by the enlarged width area, eliminating the problem of reduced cooling fluid flow in the channel.

19 Claims, 9 Drawing Sheets

(51) Int. Cl.
  *B33Y 50/02* (2015.01)
  *B22F 3/105* (2006.01)
  *B23K 15/06* (2006.01)
  *B23K 26/12* (2014.01)
  *B23K 15/00* (2006.01)
  *B23K 26/00* (2014.01)
  *B23K 26/082* (2014.01)
  *B22F 5/10* (2006.01)
  *B23K 101/00* (2006.01)
  *B23K 103/18* (2006.01)
  *B33Y 10/00* (2015.01)

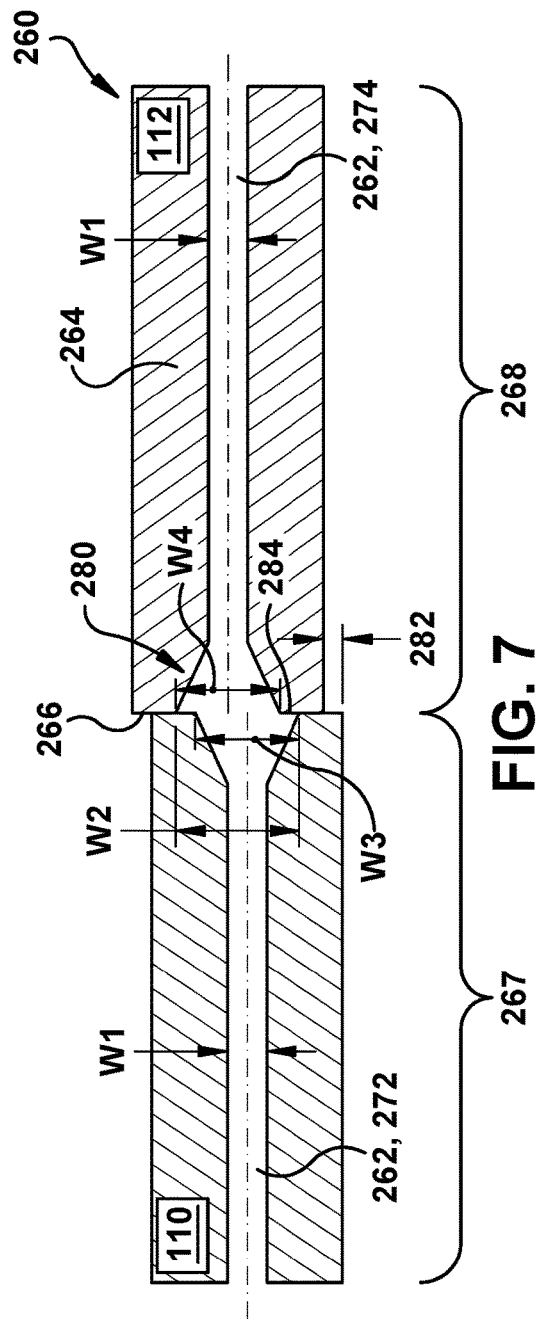
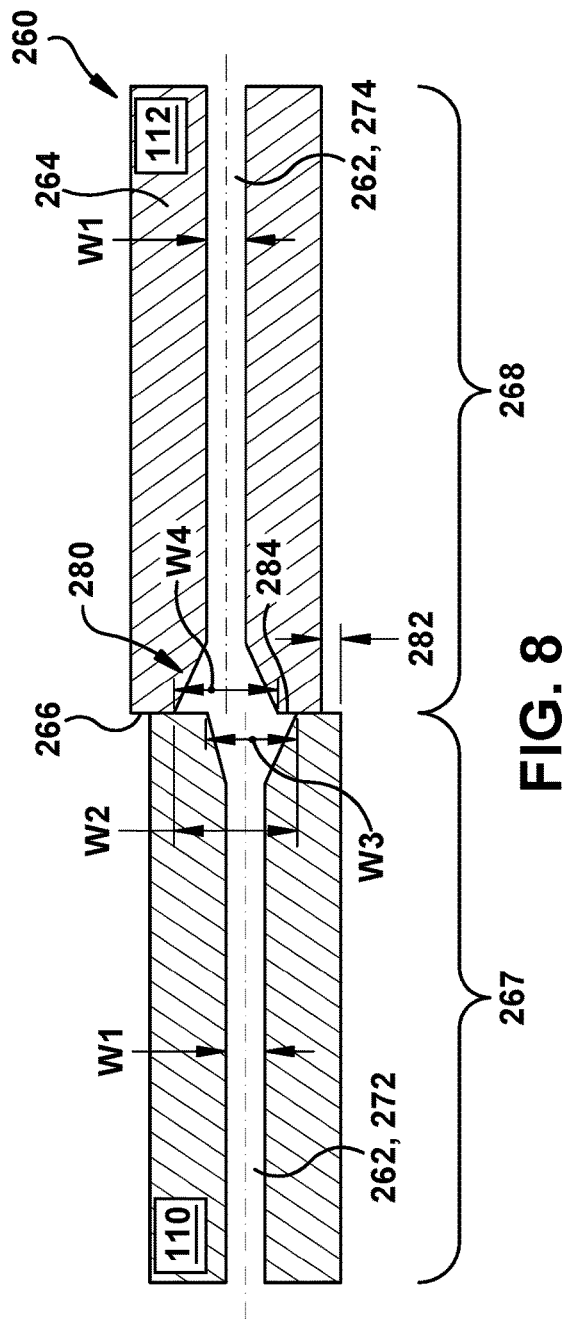

ADDITIVE MANUFACTURED COMPONENT WITH ENLARGED WIDTH AREA IN CHANNEL AT MELTING BEAMS' FIELD INTERFACE

BACKGROUND OF THE INVENTION

The disclosure relates generally to additive manufacturing, and more particularly, to an additive manufactured component with an enlarged width area in a channel at an interface where a pair of melting beam fields meet or overlap.

The pace of change and improvement in the realms of power generation, aviation, and other fields has accompanied extensive research for manufacturing components used in these fields. Conventional manufacture of metallic, plastic and metal ceramic components generally includes milling or cutting away regions from a slab of metal before treating and modifying the cut metal to yield a part, which may have been simulated using computer models, e.g., in drafting software. Manufactured components which may be formed from metal can include, e.g., airfoil components for installation in a turbomachine such as an aircraft engine or power generation system. The development of additive manufacturing can reduce manufacturing costs by allowing such components to be formed more quickly, with unit-to-unit variations as appropriate. Among other advantages, additive manufacture can directly apply computer-generated models to a manufacturing process while relying on less expensive equipment and/or raw materials.

Additive manufacturing (AM) includes a wide variety of processes of producing a component through the successive layering of material rather than the removal of material. As such, additive manufacturing can create complex geometries without the use of any sort of tools, molds or fixtures, and with little or no waste material. Instead of machining components from solid billets of material, much of which is cut away and discarded, the only material used in additive manufacturing is what is required to shape the component.

Additive manufacturing techniques typically include taking a three-dimensional computer aided design (CAD) file of the component to be formed, electronically slicing the component into layers, e.g., 18-102 micrometers thick, and creating a file with a two-dimensional image of each layer, including vectors, images or coordinates. The file may then be loaded into a preparation software system that interprets the file such that the component can be built by different types of additive manufacturing systems. In 3D printing, rapid prototyping (RP), and direct digital manufacturing (DDM) forms of additive manufacturing, material layers are selectively dispensed, sintered, formed, deposited, etc., to create the component.

In metal powder additive manufacturing techniques, such as direct metal laser melting (DMLM) (also referred to as selective laser melting (SLM)), metal powder layers are sequentially melted together to form the component. More specifically, fine metal powder layers are sequentially melted after being uniformly distributed using an applicator on a metal powder bed. Each applicator includes an applicator element in the form of a lip, brush, blade or roller made of metal, plastic, ceramic, carbon fibers or rubber that spreads the metal powder evenly over the build platform. The metal powder bed can be moved in a vertical axis. The process takes place in a processing chamber having a precisely controlled atmosphere of inert gas, e.g., argon or nitrogen. Once each layer is created, each two dimensional slice of the component geometry can be fused by selectively melting the metal powder. The melting may be performed by a melting beam source such as a high powered laser, e.g., a 100 Watt ytterbium laser, to fully weld (melt) the metal powder to form a solid metal. The melting beam source moves in the X-Y direction using, e.g., scanning mirrors, and has an intensity sufficient to fully weld (melt) the metal powder to form a solid metal. The metal powder bed is lowered for each subsequent two dimensional layer, and the process repeats until the component is completely formed.

In order to create more components faster or create certain larger components faster, some metal additive manufacturing systems employ multiple melting beam sources, such as high powered lasers, that work together to form a component. Where multiple melting beam sources are used, the melting beams must be precisely aligned to create high quality components. For example, misalignment of a pair of melting beam sources during manufacture of components with cooling channels therein (such as those used in the power generation, aviation and other fields) can be a challenge. In particular, a misalignment of melting beam sources can create a cooling channel with a step in the channel at an interface of the melting beam sources' fields. The interface may be a plane where the fields meet, or a three dimensional region where the fields overlap. To further explain, FIGS. 1-3 show a component 10 including a stepped channel 12 formed at an interface 14 where fields of the melting beam sources (not shown) meet. FIG. 1 shows a longitudinal cross-sectional view of component 10 including stepped channel 12; FIG. 2 shows a schematic perspective view of stepped channel 12; and FIG. 3 shows a lateral cross-sectional view of stepped channel 12. One melting beam source creates component 10 and stepped channel 12 on one side of interface 14, while another melting beam source creates them on the other side of interface 14. Here, a misalignment 16 of melting beam sources (not shown) used to create the channel creates a step 18 in stepped channel 12 at an interface 14. Step 18 might be up to 0.1-0.2 millimeter (mm) in a well calibrated machine, but steps up to 0.5 mm are possible. Steps as small as 0.1 mm can result in a reduction in flow in stepped channel 12 area in the order of, for example, 5% to 20%. In any event, step 18 creates a reduction of the fluid flow in stepped channel 12.

BRIEF DESCRIPTION OF THE INVENTION

A first aspect of the disclosure provides a component, comprising: a body; an interface in the body, the interface defining a first and second portion of the body made by different melting beam sources of a multiple melting beam source additive manufacturing system during a single build; and a channel extending through the body, wherein the channel includes an interface-distant area on opposing sides of the interface, each interface-distant area having a first width, and wherein the channel includes an enlarged width area fluidly communicative with the interface-distant areas and spanning the interface, the enlarged width area having a second width larger than the first width.

A second aspect of the disclosure provides a non-transitory computer readable storage medium storing code representative of a component, the component physically generated upon execution of the code by a computerized metal powder, multiple melting beam source, additive manufacturing system, the code comprising: code representing the component, the code including: a body; an interface in the body, the interface defining a first and second portion of the body made by different melting beam sources of a multiple melting beam source additive manufacturing system during a single build; and a channel extending through the body, wherein the channel includes an interface-distant area on opposing sides of the interface, each interface-distant area having a first width, and wherein the channel includes an enlarged width area fluidly communicative with the interface-distant areas and spanning the interface, the enlarged width area having a second width larger than the first width.

A third aspect of the disclosure provides a computerized additive manufacturing (AM) system using multiple melting beam sources to make a component, the AM system comprising: means for inserting an enlarged width area in a channel in the component where the channel spans an interface between fields of a pair of the multiple melting beam sources.

A fourth aspect of the disclosure provides a method, comprising: in code representing a component to be additively manufactured by a multiple melting beam source additive manufacturing system, identifying where a channel in the component spans an interface between fields of a pair of the multiple melting beam sources; and inserting an enlarged width area in the channel in the component where the channel spans the interface between fields of a pair of the multiple melting beam sources.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 7 shows a longitudinal cross-sectional view of a component including a channel with an enlarged width area at an interface, according to embodiments of the disclosure.

FIG. 8 shows a longitudinal cross-sectional view of a component including a channel with an enlarged width area at an interface, according to another embodiment of the disclosure.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure it will become necessary to select certain terminology when referring to and describing part of component according to embodiments of the disclosure. As used herein, "width" of a channel indicates a largest cross-sectional dimension of the channel. "Field" indicates an area of raw material (e.g., melt powder) within which a particular melting beam source can create layers of the component (e.g., a melt pool of a metal powder layer), i.e., it is an areal range of the particular source. An "interface" is where fields of a pair of melting beam sources of an additive manufacturing system employing multiple melting beam sources meet. An interface in the body of a component thus defines a first and second portion of the body made by different melting beam sources of a multiple melting beam source additive manufacturing system during a single build. As understood, melting beam source fields may meet at a line, creating a planar interface in the component, or they may overlap, creating a three-dimensional interface in the component. "At the interface" indicates at or near a planar interface or at, near or within a three-dimensional interface, as the case may be.

As indicated above, the disclosure provides an additive manufactured component with an enlarged width area in a channel at a pair of melting beam source fields' interface. The component may include a body, and an interface in the body defining a first and second portion of the body made by different melting beam sources of a multiple melting beam source additive manufacturing system during a single build. The component also includes a channel extending through the body. The channel includes an interface-distant area on opposing sides of the interface. The interface-distant area has the typical first width of the channel as it passes through the component, whatever that width may be. The channel also includes an enlarged width area fluidly communicative with the interface-distant areas and spanning the interface. The enlarged width area has a second width larger than the first width. In this fashion, any misalignment of the melting beams that occurs at an interface is addressed by the enlarged width area, eliminating a reduced flow at the interface.

Figure 4:
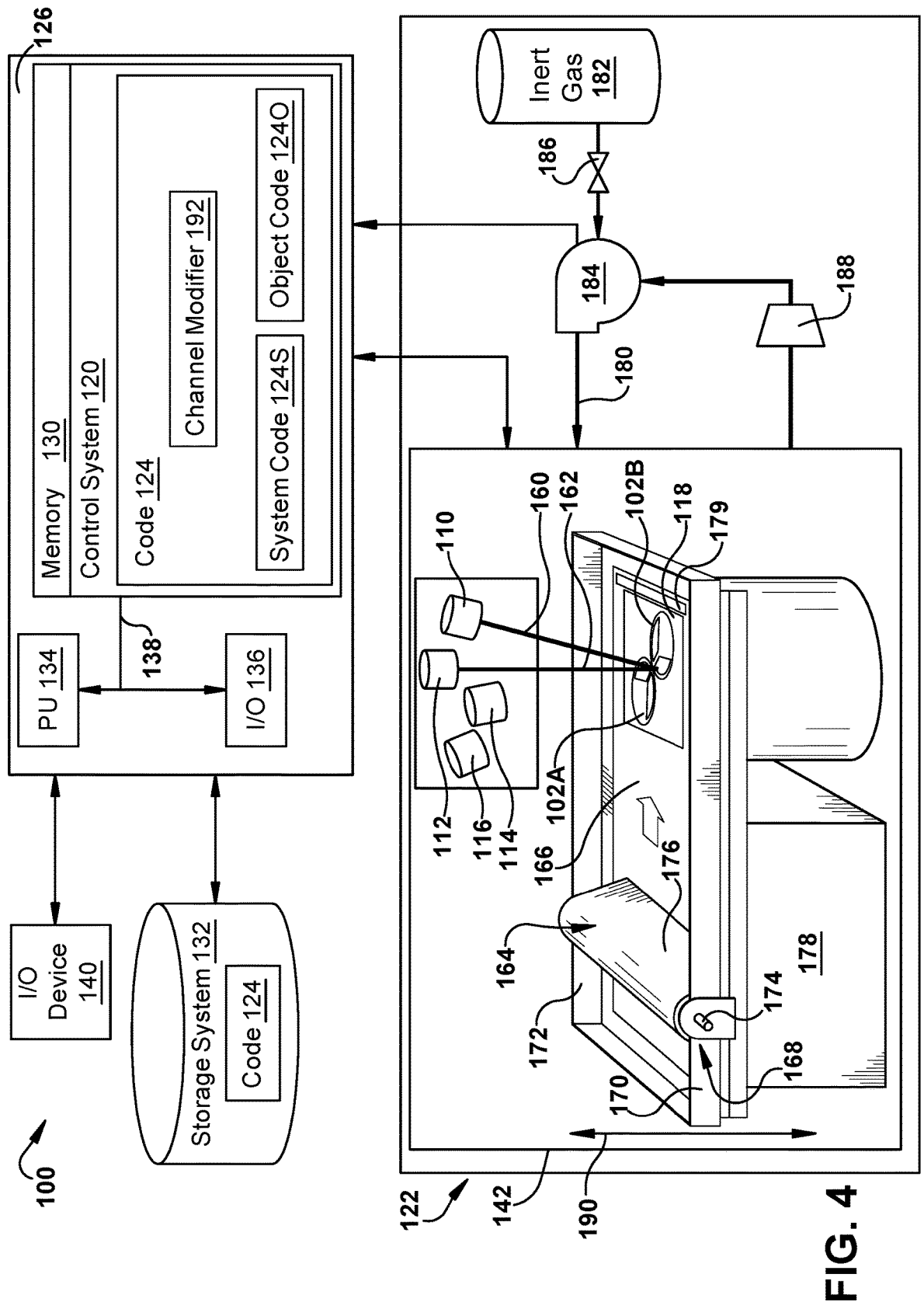
FIG. 4 shows a block diagram of an additive manufacturing system and process including a non-transitory computer readable storage medium storing code representative of a component according to embodiments of the disclosure.

FIG. 4 shows a schematic/block view of an illustrative computerized metal powder additive manufacturing system 100 (hereinafter 'AM system 100') for generating a component(s) 102, which may include one large component or multiple components, e.g., two components 102A, 102B as shown, of which only a single layer is shown. The teachings of the disclosures will be described relative to building component(s) 102 using multiple melting beam sources, e.g., four lasers 110, 112, 114, 116, but it is emphasized and will be readily recognized that the teachings of the disclosure are equally applicable to build multiple component(s) 102 using any two or more melting beam sources. In this example, AM system 100 is arranged for direct metal laser melting (DMLM). It is understood that the general teachings of the disclosure are equally applicable to other forms of metal powder additive manufacturing such as but not limited to direct metal laser sintering (DMLS), selective laser sintering (SLS), selective laser melting (SLM), electron beam melting (EBM), and perhaps other forms of additive manufacturing. Component(s) 102 are illustrated as circular elements; however, it is understood that the additive manufacturing process can be readily adapted to manufacture any shaped component, a large variety of components and a large number of components on a build platform 118 (see e.g., FIG. 10).

AM system 100 generally includes a metal powder additive manufacturing control system 120 ("control system") and an AM printer 122. As will be described, control system 120 executes set of computer-executable instructions or code 124 to generate component(s) 102 using multiple melting beam sources 110, 112, 114, 116. In the example shown, four melting beam sources may include four lasers. However, the teachings of the disclosures are applicable to any melting beam source, e.g., an electron beam, laser, etc. Control system 120 is shown implemented on computer 126 as computer program code. To this extent, computer 126 is shown including a memory 130 and/or storage system 132, a processor unit (PU) 134, an input/output (I/O) interface 136, and a bus 138. Further, computer 126 is shown in communication with an external I/O device/resource 140 and storage system 132. In general, processor unit (PU) 134 executes computer program code 124 that is stored in memory 130 and/or storage system 132. While executing computer program code 124, processor unit (PU) 134 can read and/or write data to/from memory 130, storage system 132, I/O device 140 and/or AM printer 122. Bus 138 provides a communication link between each of the components in computer 126, and I/O device 140 can comprise any device that enables a user to interact with computer 126 (e.g., keyboard, pointing device, display, etc.). Computer 126 is only representative of various possible combinations of hardware and software. For example, processor unit (PU) 134 may comprise a single processing unit, or be distributed across one or more processing units in one or more locations, e.g., on a client and server. Similarly, memory 130 and/or storage system 132 may reside at one or more physical locations. Memory 130 and/or storage system 132 can comprise any combination of various types of non-transitory computer readable storage medium including magnetic media, optical media, random access memory (RAM), read only memory (ROM), etc. Computer 126 can comprise any type of computing device such as an industrial controller, a network server, a desktop computer, a laptop, a handheld device, etc.

As noted, AM system 100 and, in particular control system 120, executes code 124 to generate component(s) 102. Code 124 can include, inter alia, a set of computer-executable instructions 124S (herein also referred to as 'code 124S') for operating AM printer 122, and a set of computer-executable instructions 124O (herein also referred to as 'code 124O') defining component(s) 102 to be physically generated by AM printer 122. Further, as will be described herein, in accordance with embodiments of the disclosure, code 124 may include a channel modifier 192 to modify code 124O. As described herein, additive manufacturing processes begin with a non-transitory computer readable storage medium (e.g., memory 130, storage system 132, etc.) storing code 124. Set of computer-executable instructions 124S for operating AM printer 122 may include any now known or later developed software code capable of operating AM printer 122.

Set of computer-executable instructions 124O defining component(s) 102 may include a precisely defined 3D model of a component and can be generated from any of a large variety of well-known computer aided design (CAD) software systems such as AutoCAD®, TurboCAD®, DesignCAD 3D Max, etc. In this regard, code 124O can include any now known or later developed file format. Furthermore, code 124O representative of component(s) 102 may be translated between different formats. For example, code 124O may include Standard Tessellation Language (STL) files which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional component to be fabricated on any AM printer. Code 124O representative of component(s) 102 may also be converted into a set of data signals and transmitted, received as a set of data signals and converted to code, stored, etc., as necessary. Code 124O may be modified by channel modifier 192 to include enlarged width areas 280, as will be described herein. In any event, code 124O may be an input to AM system 100 and may come from a part designer, an intellectual property (IP) provider, a design company, the operator or owner of AM system 100, or from other sources. In any event, control system 120 executes code 124S and 124O, dividing component(s) 102 into a series of thin slices that assembles using AM printer 122 in successive layers of material.

AM printer 122 may include a processing chamber 142 that is sealed to provide a controlled atmosphere for component(s) 102 printing, e.g., a set pressure and temperature for lasers, or a vacuum for electron beam melting. A build platform 118, upon which component(s) 102 is/are built, is positioned within processing chamber 142. A number of melting beam sources 110, 112, 114, 116 are configured to melt layers of metal powder on build platform 118 to generate component(s) 102. While four melting beam sources 110, 112, 114, 116 will be described herein, it is emphasized that the teachings of the disclosure are applicable to a system employing any two or more sources, e.g., 2, 3, or 5 or more.

Figure 5:
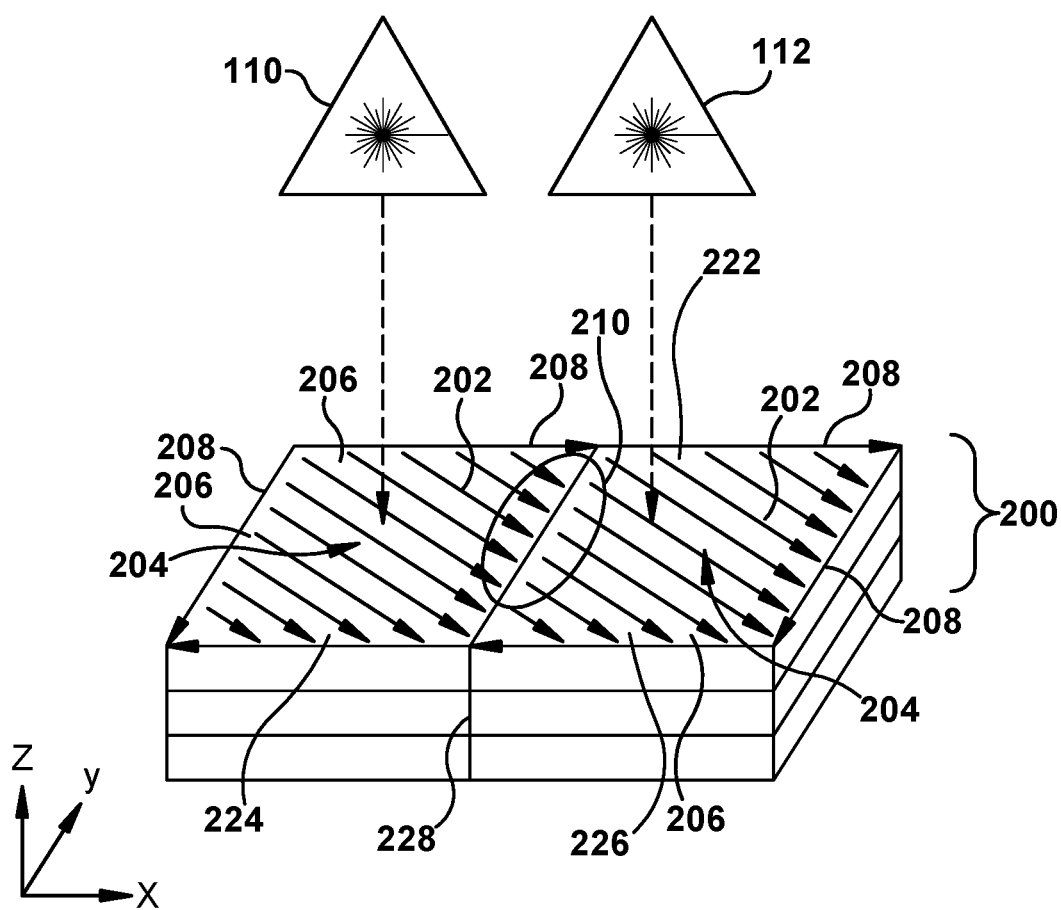
FIG. 5 shows a schematic perspective view of a two melting beam source additive manufacturing system building a component.

FIG. 5 shows a schematic perspective view of melting beams of AM system using two melting beam sources 110, 112, e.g., lasers. During operation, the melting beam(s) (dashed lines) are guided, e.g., by scanner mirrors for lasers or electromagnetic field/electric coils for electron beams, along scan vectors (paths), which are indicated by arrows on a top surface of illustrative component 200. Internal scan vectors 202 melt inner regions 204 of component 200 that scan linearly across a layer, and a very thin border 206 is melted with one to three contour scan vectors 208 that only follow a desired outer edge of the layer. Each laser 110, 112 has its own field (1 and 2, respectively) upon which it can work. Each melting beam source 110, 112 may work within only a small portion of its respective field at any given time. Each field and the scan vectors are assigned to one or the other source 110, 112 with an interface 210 (within circle) where fields 1, 2 of pair of sources 110, 112 meet. Which scan vector is made by which source usually depends on the region that can be reached by each source. Each melting beam source 110, 112 is calibrated in any now known or later developed manner. That is, each melting beam source 110, 112 has had its laser or electron beam's anticipated position relative to build platform 118 correlated with its actual position in order to provide an individual position correction (not shown) to ensure its individual accuracy. Interface 210 in body 222 of component 200 defines a first portion 224 and a second portion 226 of body 222 made by different melting beam sources 110, 112 of multiple melting beam source AM system 100 during a single build. Here, fields 1, 2 meet at a line, creating a planar interface 228 in component 200. Here, "at the interface" indicates at or near planar interface 228. It is recognized that sources 110, 112 may also have overlapping fields, as will be described relative to FIG. 6.

Figure 6:
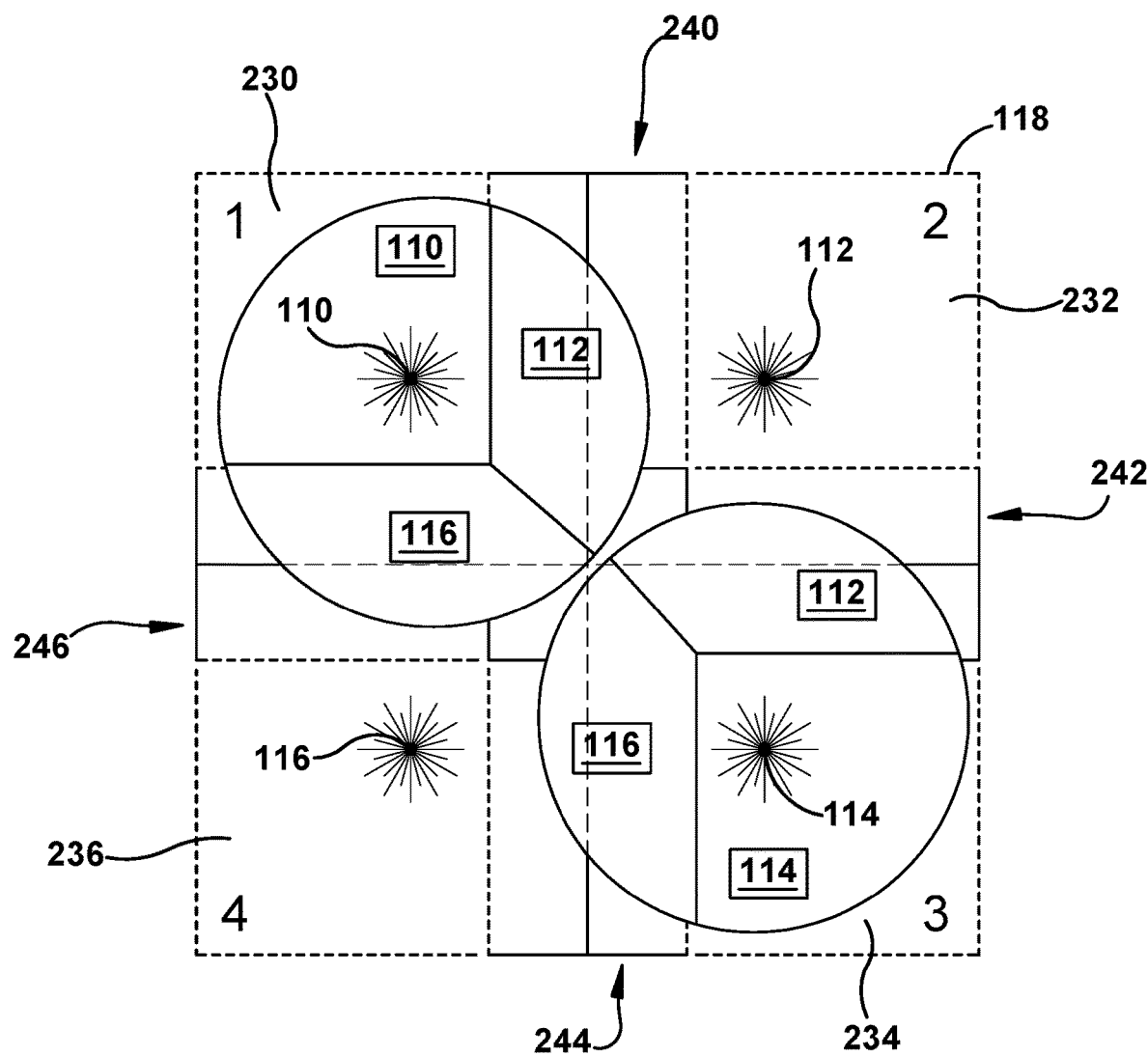
FIG. 6 shows a schematic plan view of respective fields of a four melting beam source additive manufacturing system.

FIG. 6 shows a schematic plan view of melting beams of AM system using four melting beam sources 110, 112, 114, 116, e.g., lasers. FIG. 6 shows interfaces for sources having overlapping fields. That is, in contrast to FIG. 5, fields here overlap. Each melting beam source 110, 112, 114, 116 has a field 1, 2, 3 or 4 including a non-overlapping field region 230, 232, 234, 236, respectively, in which it can exclusively melt metal powder, and at least one overlapping field region or interfaces 240, 242, 244, 246 in which two or more sources can melt metal powder. (Boxed numbers of sources 110, 112, 114, 116 indicate which source creates the shape illustrated thereabout). In this regard, each melting beam source 110, 112, 114, 116 may generate a melting beam (two shown, 160, 162, in FIG. 4), respectively, that fuses particles for each slice, as defined by code 124O. For example, in FIG. 4, melting beam source 110 is shown creating a layer of component 102 using melting beam 160 in one region, while melting beam source 112 is shown creating a layer of component 102 using melting beam 162 in another region. Each melting beam source 110, 112, 114, 116 is calibrated in any now known or later developed manner That is, each melting beam source 110, 112, 114, 116 has had its laser or electron beam's anticipated position relative to build platform 118 correlated with its actual position in order to provide an individual position correction (not shown) to ensure its individual accuracy. In one embodiment, each of plurality melting beam sources 110, 112, 114, 116 may create melting beams, e.g., 160, 162 (FIG. 4), having the same cross-sectional dimensions (e.g., shape and size in operation), power and scan speed. It is recognized that while four sources 110, 112, 114, 116 have been illustrated to describe an interface for overlapping fields, any two sources may crate overlapping fields.

Returning to FIG. 4, an applicator 164 may create a thin layer of raw material 166 spread out as the blank canvas from which each successive slice of the final component will be created. Applicator 164 may move under control of a linear transport system 168. Linear transport system 168 may include any now known or later developed arrangement for moving applicator 164. In one embodiment, linear transport system 168 may include a pair of opposing rails 170, 172 extending on opposing sides of build platform 118, and a linear actuator 174 such as an electric motor coupled to applicator 164 for moving it along rails 170, 172. Linear actuator 174 is controlled by control system 120 to move applicator 164. Other forms of linear transport systems may also be employed.

Figure 1:
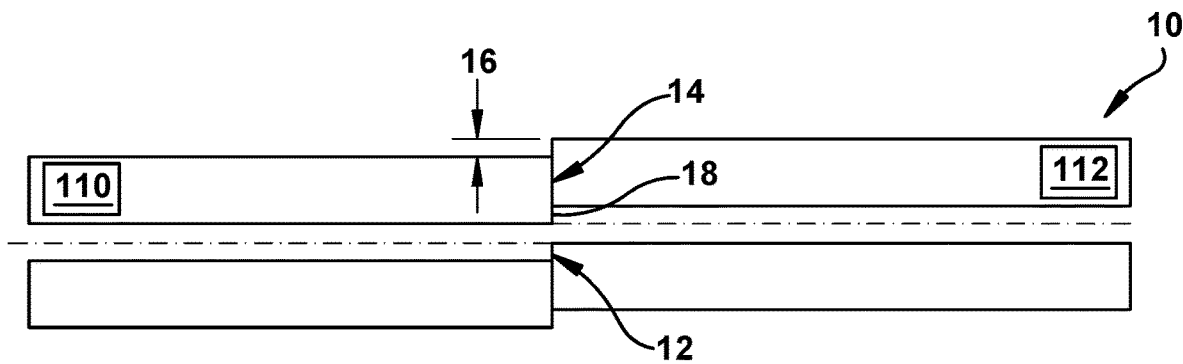
FIG. 1 shows a longitudinal cross-sectional view of a component including a conventional stepped channel.
Figure 2:
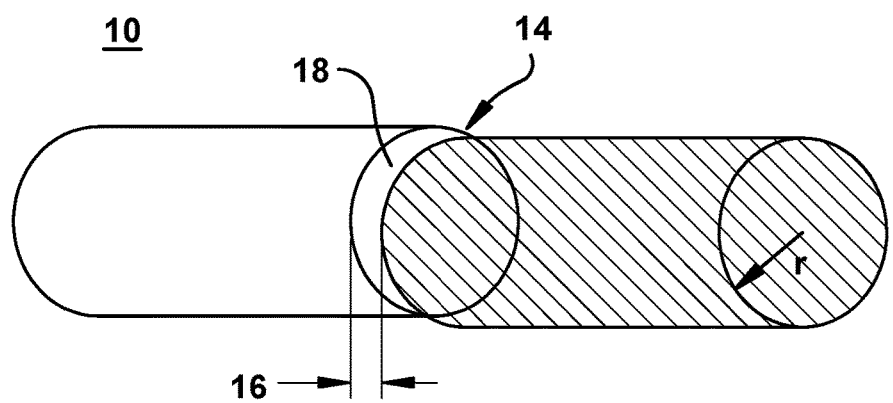
FIG. 2 shows a schematic perspective view of the stepped channel of FIG. 1.
Figure 3:
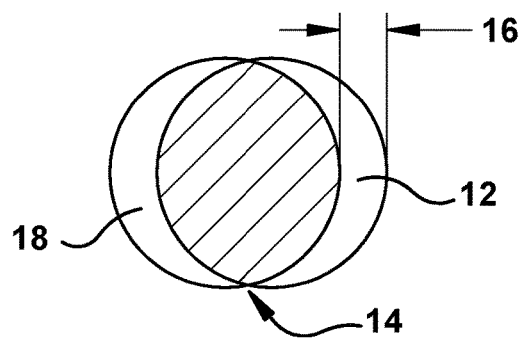
FIG. 3 shows a lateral cross-sectional view of the stepped channel of FIG. 1.

Applicator 164 take a variety of forms. In one embodiment, applicator 164 may include a body 176 configured to move along opposing rails 170, 172, and an actuator element (not shown in FIG. 1) in the form of a tip, blade, brush or roller configured to spread metal powder evenly over build platform 118, i.e., build platform 118 or a previously formed layer of component(s) 102, to create a layer of raw material. The actuator element may be coupled to body 176 using a holder (not shown) in any number of ways. The process may use different raw materials in the form of metal powder. Raw materials may be provided to applicator 164 in a number of ways. In one embodiment, shown in FIG. 4, a stock of raw material may be held in a raw material source 178 in the form of a chamber accessible by applicator 164. In other arrangements, raw material may be delivered through applicator 164, e.g., through body 176 in front of its applicator element and over build platform 118. In any event, an overflow chamber 179 may be provided on a far side of build platform 118 to capture any overflow of raw material not layered on build platform 118. In FIG. 4, only one applicator 164 is shown. In some embodiments, applicator 164 may be among a plurality of applicators in which applicator 164 is an active applicator and other replacement applicators (not shown) are stored for use with linear transport system 168. Used applicators (not shown) may also be stored after they are no longer usable.

In one embodiment, component(s) 102 may be made of a metal which may include a pure metal or an alloy. In one example, the metal may include practically any non-reactive metal powder, i.e., non-explosive or non-conductive powder, such as but not limited to: a cobalt chromium molybdenum (CoCrMo) alloy, stainless steel, an austenite nickel-chromium based alloy such as a nickel-chromium-molybdenum-niobium alloy (NiCrMoNb) (e.g., Inconel 625 or Inconel 718), a nickel-chromium-iron-molybdenum alloy (NiCrFeMo) (e.g., Hastelloy® X available from Haynes International, Inc.), or a nickel-chromium-cobalt-molybdenum alloy (NiCrCoMo) (e.g., Haynes 282 available from Haynes International, Inc.), etc. In another example, the metal may include practically any reactive metal such as but not limited to: H13 tool steel, titanium CP, Ti-6Al-4V and 7Nb, 316L and 17-4PH SS cobalt-chrome (ASTM75), aluminum Al—Si-12 and Inconel 718 and 62.

The atmosphere within processing chamber 142 is controlled for the particular type of melting beam source being used. For example, for lasers, processing chamber 142 may be filled with an inert gas such as argon or nitrogen and controlled to minimize or eliminate oxygen. Here, control system 120 is configured to control a flow of an inert gas mixture 180 within processing chamber 142 from a source of inert gas 182. In this case, control system 120 may control a pump 184, and/or a flow valve system 186 for inert gas to control the content of gas mixture 180. Flow valve system 186 may include one or more computer controllable valves, flow sensors, temperature sensors, pressure sensors, etc., capable of precisely controlling flow of the particular gas. Pump 184 may be provided with or without valve system 186. Where pump 184 is omitted, inert gas may simply enter a conduit or manifold prior to introduction to processing chamber 142. Source of inert gas 182 may take the form of any conventional source for the material contained therein, e.g. a tank, reservoir or other source. Any sensors (not shown) required to measure gas mixture 180 may be provided. Gas mixture 180 may be filtered using a filter 188 in a conventional manner. Alternatively, for electron beams, processing chamber 142 may be controlled to maintain a vacuum. Here, control system 120 may control a pump 184 to maintain the vacuum, and flow valve system 186, source of inert gas 182 and/or filter 188 may be omitted. Any sensors (not shown) necessary to maintain the vacuum may be employed.

A vertical adjustment system 190 may be provided to vertically adjust a position of various parts of AM printer 122 to accommodate the addition of each new layer, e.g., a build platform 118 may lower and/or chamber 142 and/or applicator 164 may rise after each layer. Vertical adjustment system 190 may include any now known or later developed linear actuators to provide such adjustment that are under the control of control system 120.

In operation, build platform 118 with metal powder thereon is provided within processing chamber 142, and control system 120 controls flow of gas mixture 180 within processing chamber 142 from source of inert gas 182. Control system 120 also controls AM printer 122, and in particular, applicator 164 (e.g., linear actuator 174) and melting beam sources 110, 112, 114, 116 to sequentially melt layers of metal powder on build platform 118 to generate component(s) 102 according to embodiments of the disclosure. As noted, various parts of AM printer 122 may vertically move via vertical adjustment system 190 to accommodate the addition of each new layer, e.g., a build platform 118 may lower and/or chamber 142 and/or applicator 164 may rise after each layer.

FIG. 7 shows a longitudinal cross-sectional view of an additively manufactured component 260 including a channel 262 according to embodiments of the disclosure. Channel 262 can be any fluid carrying channel within component 260, e.g., cooling fluid, fuel or other fluid. Component 260 may include a body 264, and an interface 266 in body 264. Interface 266 defines a first portion 267 and a second portion 268 of body 264 made by different melting beam sources 110, 112 (not shown, but area produced thereby indicated by boxed numbers) of multiple melting beam source AM system 100 during a single build. That is, component 260 is made by AM system 100 in a single running of the system forming an integral component. Parts of component 260 surrounding channel 262 have been omitted for clarity in FIG. 7-9.

Channel 262 extends through body 264, e.g., to provide a fluid flow therethrough. In one example, the fluid may be a cooling fluid (not shown), which may include any now known or later developed cooling fluid, e.g., steam, air, water, exhaust gases, etc. Channel 262 may have any cross-sectional shape desired such as but not limited to: circular, diamond, elliptical or egg-shaped. As noted, a "width" of channel 262 indicates a largest cross-sectional dimension of the channel. In FIG. 7, different melting beam sources 110, 112 have respective fields (indicated by different cross-hatching) that meet along a line at interface 266 such that interface 266 takes the form of a plane (in and out of page) that extends through body 264. Here, "at the interface" indicates at or near the plane of interface 266.

Channel 262 includes an interface-distant area 272, 274 on opposing sides of interface 266. Each interface-distant area 272, 274 of channel 262 has a first width W1. First width W1 is a typical width of the channel as it passes through component 260. That is, first width W1 is the designed-for width of channel 262, and can be any size desired. For example, channel 262 may be what is referred to as a microchannel which have a width of 0.4-1.5 mm, or channel 262 could be smaller or larger than a microchannel.

Figure 9:
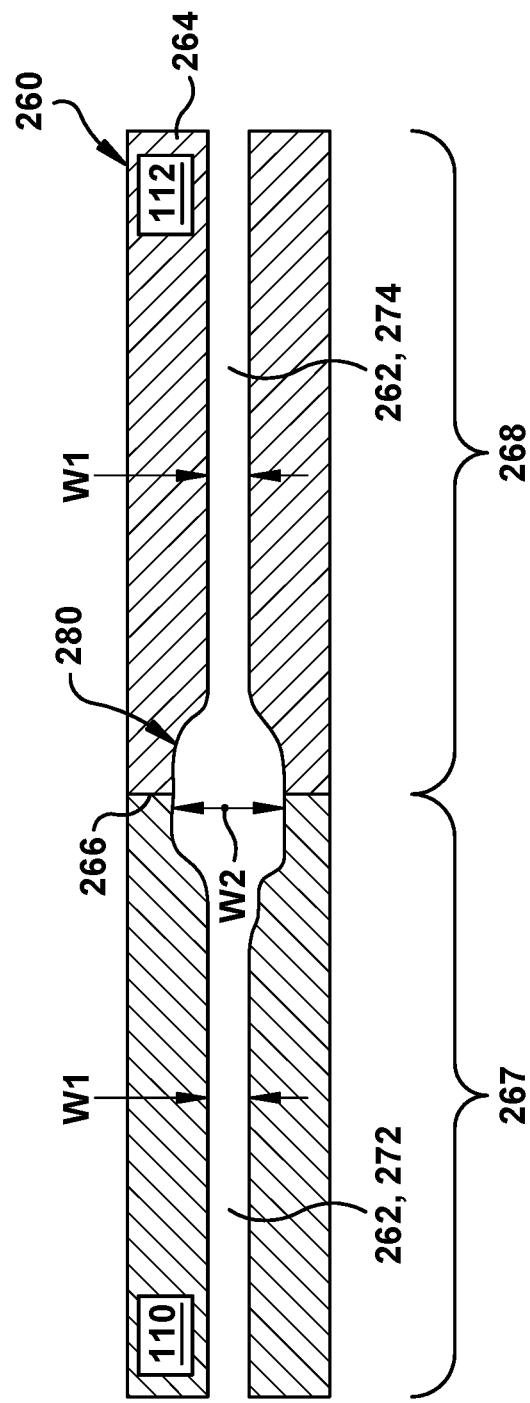
FIG. 9 shows a longitudinal cross-sectional view of a component including a channel with an enlarged width area at an interface, according to another embodiment of the disclosure.

As shown in FIGS. 7-9, in contrast to conventional components, channel 262 includes an enlarged width area 280 fluidly communicative with interface-distant areas 272, 274 and spanning interface 266. Enlarged width area 280 has a second width W2 larger than first width W1. Second width W2 may be considered a collective cross-sectional width at interface 266 of enlarged width area 280 on either side of interface 266. In this fashion, as shown in FIGS. 7 and 8, even though a misalignment 282, creating a step 284, may be created during additive manufacture of component 260, step 284 does not create a restrictive flow in channel 262. That is, step 284 is encompassed by enlarged width area 280 such that any restriction in flow that could result is addressed by the additional volume of enlarged width area 280. Enlarged width area 280 may have any width W2 sufficient to address any step 284 considered possible using a particular AM system 100 and/or a particular type of melting beam source 110, 112, 114, 116. Enlarged width area 280 can have any length similar or greater than that of interface 266 (and interfaces 240, 242, 244, 246, FIG. 10).

In FIGS. 7 and 8, in which a step 284 is present, second width W2 may include a third width W3 in first portion 267 of body 264 on a first side of interface 266, and a fourth width W4 in second portion 268 of body 264 on a second side of interface 266. Third width W3 and fourth width W4 are each larger than first width W1. Where melting beam sources 110, 112 are misaligned, width W3 in first portion 267 may be misaligned with fourth width W4 in second portion 268, creating step 284 at interface 266. In FIG. 7, third width W3 and fourth width W4 may be identical, while in FIG. 8, third width W3 and fourth width W4 are different—third width W3 is smaller in the example shown. Third and fourth widths W3, W4 of enlarged width area 280 may have any size sufficient to address any step 284 considered possible using a particular AM system 100 and/or a particular type of melting beam source 110, 112, 114, 116. FIG. 9 shows an example where no misalignment occurs and no step is present. Here, second width W2 is still larger than first width W1.

Figure 10:
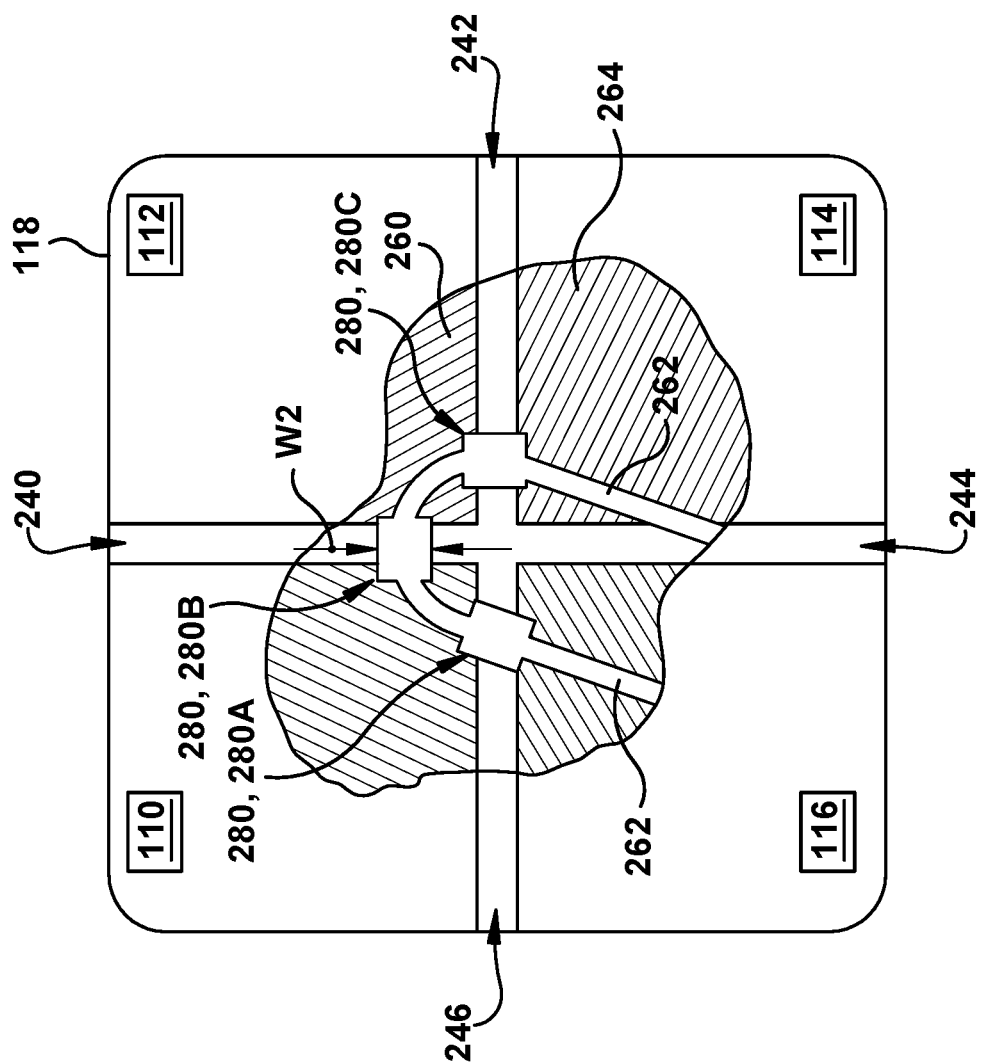
FIG. 10 shows a schematic plan view of respective fields of a four melting beam source additive manufacturing system, and including a component including a channel with enlarged width areas at interfaces, according to embodiments of the disclosure.

FIG. 10 shows a schematic plan view of melting beams of AM system 100 (FIG. 4) using four melting beam sources 110, 112, 114, 116, e.g., lasers. In FIG. 10, different melting beam sources 110, 112, 114, 116 have respective fields that overlap at respective interfaces 240, 242, 244, 246. Here, each interface 110, 112, 114, 116 takes the form of a three-dimensional region (in and out of page), and each enlarged width area, e.g., 280A, extends through the three-dimensional region of a respective interface, e.g., 246. FIG. 10 also illustrates an embodiment in which the interface actually includes a plurality of interfaces 240, 242, 246 spread out in body 264 and enlarged width area 280 includes a plurality of enlarged width areas 280A, 280B, 280C along a length of channel 262. Here, each enlarged width area 280A, 280B, 280C spans a respective interface 240, 242, 246 of plurality of interfaces 240, 242, 244, 246. In this fashion, wherever channel 262 spans an interface, an enlarged width area 280 can be provided to eliminate any chance of a step 284 (FIGS. 7 and 8) creating a restricted flow of cooling fluid.

Turning to FIGS. 7-13 collectively, a shape of channel 262 may vary over its length, and channel 262 and enlarged width area 280 may any shape which benefits the mechanical properties of component 260. In one embodiment, shown in FIGS. 7-9, second width W2 may taper from interface 266 to first width W1 in interface-distant areas 272, 274. The taper can take any of a variety of forms. In FIGS. 7 and 8, the taper is linear in cross-section creating a pair of end facing frusto-conical volumes, while in FIG. 9, the taper is more rounded in cross-section compared to the tapered embodiment, creating a three-dimensional ellipsoid volume. In FIG. 10, second width W2 does not taper and is stepped, creating a cubical volume for enlarged width area, e.g., 280A. In one embodiment, shown in FIG. 11, interface-distant area(s) 272, 274 and enlarged width area 280 each have a circular cross-sectional shape, and first and second width W1, W2 (FIGS. 7-9) (and widths W3, W4) dimensions are diameters. FIG. 10 also shows that an enlarged width area can be aligned with channel 262 or misaligned with channel 262. For example, enlarged width area 280A made by melting beam sources 110, 116 is aligned with channel 262 (misaligned with interface 246), while enlarged width area 280C made by melting beam sources 112, 114 is misaligned with channel 262 (aligned with interface 242).

Figure 13:
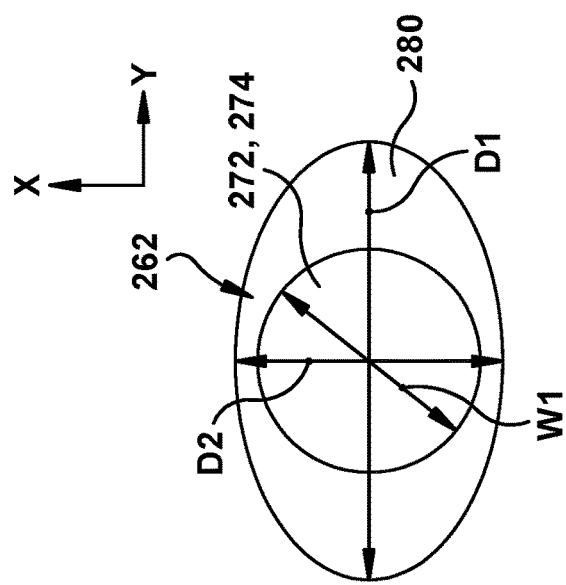
FIG. 13 shows a lateral cross-sectional view of a channel with a differently shaped enlarged width area at an interface, according to another embodiment of the disclosure.
Figure 12:
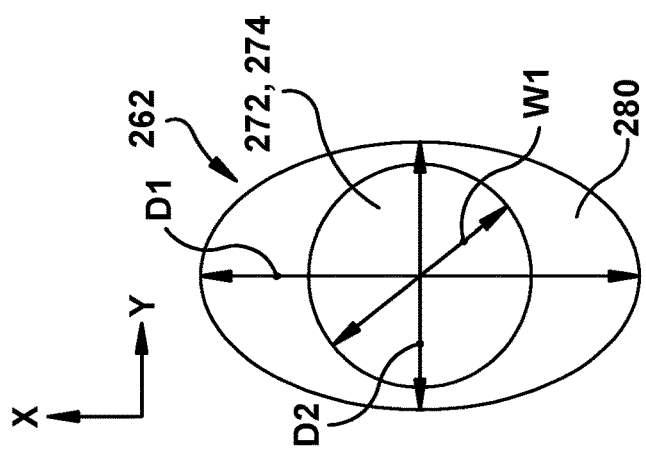
FIG. 12 shows a lateral cross-sectional view of a channel with a differently shaped enlarged width area at an interface, according to embodiments of the disclosure.
Figure 11:
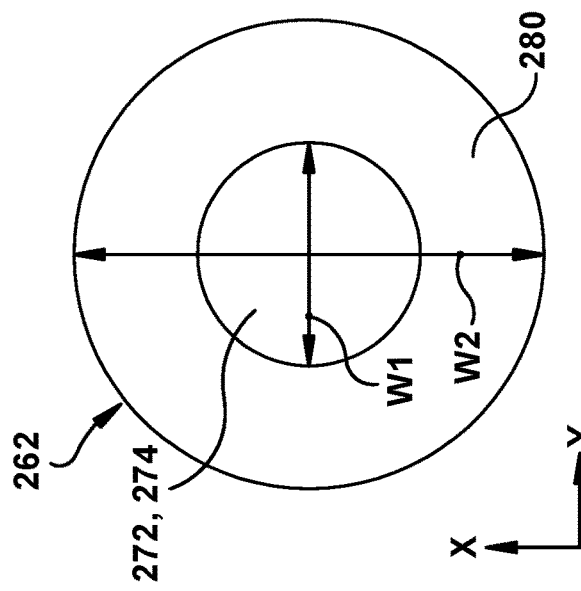
FIG. 11 shows a lateral cross-sectional view of a channel with an enlarged width area at an interface, according to embodiments of the disclosure.

In alternative embodiments, as shown in FIGS. 12 and 13, interface-distant area(s) 272, 274 has/have a first cross-sectional shape and enlarged width area 280 has a different, second cross-sectional shape. In FIGS. 12 and 13 example, interface-distant area(s) 272, 274 have a circular cross-sectional shape, and enlarged width area 280 has a substantially elliptical cross-sectional shape, i.e., an elongated hole having a cross-section that is oval, or that of a rugby ball or American football. In this case, each axis, i.e., major axis D1 and minor axis D2, of the substantially elliptical cross-sectional shape has a distance that is larger than first width W1. (Here, the major axis D1 is the largest cross-sectional dimension and thus would correspond to second width W2). An enlarged width area 280 having a different shape than interface-distant area(s) 272, 274 allows for enlarged width area 280 to be sized in a selected direction (e.g., major axis D1 and/or minor axis D2 in FIGS. 12 and 13) to accommodate an anticipated direction of misalignment. For example in FIG. 12, enlarged width area 280 is arranged with a major axis D1 set in an X direction and smaller minor axis D2 in a Y-direction in anticipation of a misalignment in the X-direction. Hence, more volume is provided for a misalignment or step 284 (FIGS. 7 and 8) in the X-direction. In another example in FIG. 13, enlarged width area 280 is arranged with larger, major axis D1 set in a Y direction in anticipation of a misalignment in the Y-direction. Enlarged width area 280 can have any shape (e.g., oval, egg-shaped, rectangular, rectangular with rounded corners, etc.) having different dimensions, and can be set at any angle desired to accommodate for any anticipated misalignment. In this fashion, a misalignment between any melting beam sources 110, 112, 114, 116 at any interface(s) 266, 240, 242, 244, 246 can be addressed, and restrictive flow of channel 262 eliminated.

Figure 14:
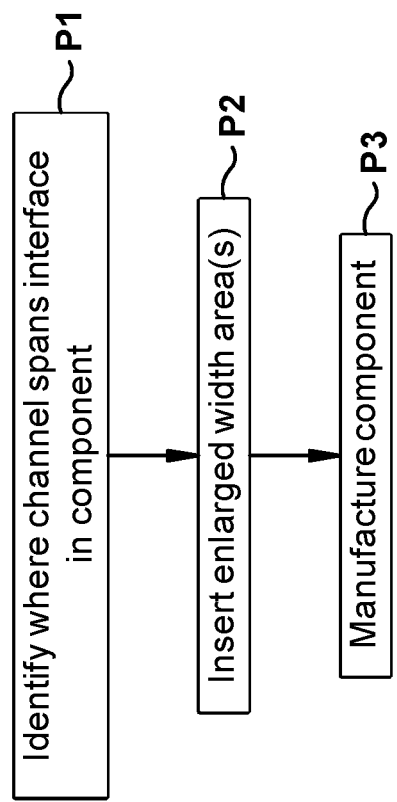
FIG. 14 shows a flow diagram of an operational methodology according to embodiments of the disclosure.

Referring to FIG. 14, a flow diagram of an operational method according to embodiments of the disclosure is shown. Generally, according to the method, code 124O representing component 260 is evaluated to determine where channel 262 spans an interface 266, 240, 242, 244, 246, and is modified to include enlarged width area(s) 280, where appropriate. More specifically, in process P1, where channel 262 in component 260 spans interface 266, 240, 242, 244, 246 between fields of a pair of multiple melting beam sources 110, 112, 114, 116 is identified in code 124O representing component 260 (to be additively manufactured by multiple melting beam source AM system 100). Any number of locations in channel(s) 262 spanning an interface can be identified in this step. In one embodiment, this process may include scanning code 124O in any now known or later developed fashion to identify where channel(s) 262 span interface(s) 266, 240, 242, 244, 246, e.g., using a search/scan process in a CAD system and/or software used to prepare AM build jobs and computer aided machining (CAM)software. In process P2, enlarged width area(s) 280 are inserted in channel(s) 262 in component 260 where the channel(s) span interface(s) between fields of a pair of multiple melting beam sources 110, 112, 114, 116. That is, code 124O is modified to include enlarged width area(s) 280 where channel(s) 262 span interface(s) between fields of a pair of multiple melting beam sources 110, 112, 114, 116. The insertion can be carried out automatically in software, or manually by a user.

In one embodiment, processes P1 and P2, can be carried out during a design stage of component 260. That is, set of computer-executable instructions, i.e., code 124O, defining component(s) 260 that includes a precisely defined 3D model of a component, can be modified using any of a large variety of well-known computer aided design (CAD) software systems such as AutoCAD®, TurboCAD®, Design-CAD 3D Max, etc. The process can be manual or automated using any now known or later developed search/scan and change CAD software. Here, the modification can be made by a part designer, an intellectual property (IP) provider, a design company, the operator or owner of AM system 100, or other sources, prior to input into AM system 100. In another embodiment, referring to FIG. 1, AM system 100 may include channel modifier 192 that carries out processes P1 and P2 upon receipt of code 124O by AM system 100. Channel modifier 192 can carry out the processes manually or automatically using, for example, any a search/scan and change software module appropriate for the file type of code 124O. In any event, channel modifier 192 inserts enlarged width area(s) 280 in channel(s) 262 in component 260 where the channel spans an interface 266, 240, 242, 244, 246 between fields of a pair of the multiple melting beam sources 110, 112, 114, 116. As noted, code 124O, as modified, can include any now known or later developed file format, and may be translated, converted, transmitted, received, stored, etc., as necessary.

In process P3, AM system 100 is used to manufacture component 260 including enlarged width area(s) 280 in channel(s) 262 thereof. That is, control system 120 executes code 124S and 124O, dividing component(s) 260 into a series of thin slices that assembles it using AM printer 122 in successive layers of material.

Embodiments of the disclosure provide a technical effect of creating an enlarged width area in a channel in multiple melting beam source field interfaces. By enlarging the channel width, the interface will not be able to present a restricted flow or bottleneck issue, but will be larger than the channel itself. The disclosure thus reduces the efforts necessary to address melting beam source misalignments.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

"Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A component, comprising:
   a body;
   an interface in the body, the interface defining a first and second portion of the body made by different melting beam sources of a multiple melting beam source additive manufacturing system during a single build; and
   a channel extending through the body,
   wherein the channel includes an interface-distant area on opposing sides of the interface, each interface-distant area having a first width, and
   wherein the channel includes an enlarged width area fluidly communicative with the interface-distant areas and spanning the interface, the enlarged width area having a second width larger than the first width,
   wherein the second width includes a third width in the first portion of the body on a first side of the interface, and a fourth width in the second portion of the body on a second side of the interface, wherein the third width and the fourth width are each larger than the first width.

2. The component of claim 1, wherein the third width in the first portion is misaligned with the fourth width in the second portion, creating a step at the interface.

3. The component of claim 1, wherein the third width and the fourth width are identical.

4. The component of claim 1, wherein the second width tapers from the interface to the first width.

5. The component of claim 1, wherein the different melting beam sources have respective fields that meet along a line at the interface, the interface being planar.

6. The component of claim 1, wherein the different melting beam sources have respective fields that overlap at the interface, the interface being a three-dimensional region, wherein the enlarged width area extends through the three-dimensional region of the interface.

7. The component of claim 1, wherein the interface-distant area and the enlarged width area each have a circular cross-sectional shape, and the first and second width dimensions are diameters.

8. The component of claim 1, wherein the interface-distant area has a first cross-sectional shape and the enlarged width area has a different, second cross-sectional shape.

9. The component of claim 8, wherein the interface-distant area has a circular cross-sectional shape, and the enlarged width area has a substantially elliptical cross-sectional shape, a distance of each axis of the substantially elliptical cross-sectional shape being larger than the first width.

10. The component of claim 1, wherein the interface includes a plurality of interfaces in the body and the enlarged width area includes a plurality of enlarged width areas along a length of the channel, each enlarged width area spanning a respective interface of the plurality of interfaces.

11. A component, comprising:
    a body;
    an interface in the body, the interface defining a first and second portion of the body made by different melting beam sources of a multiple melting beam source additive manufacturing system during a single build; and
    a channel extending through the body,
    wherein the channel includes an interface-distant area on opposing sides of the interface, each interface-distant area having a first width, and
    wherein the channel includes an enlarged width area fluidly communicative with the interface-distant areas and spanning the interface, the enlarged width area having a second width larger than the first width,
    wherein the interface-distant area has a first cross-sectional shape and the enlarged width area has a different, second cross-sectional shape.

12. The component of claim 11, wherein the second width includes a third width in the first portion of the body on a first side of the interface, and a fourth width in the second portion of the body on a second side of the interface, wherein the third width and the fourth width are each larger than the first width, and wherein the third width in the first portion is misaligned with the fourth width in the second portion, creating a step at the interface.

13. The component of claim 12, wherein the third width and the fourth width are identical.

14. The component of claim 11, wherein the second width tapers from the interface to the first width.

15. The component of claim 11, wherein the different melting beam sources have respective fields that meet along a line at the interface, the interface being planar.

16. The component of claim 11, wherein the different melting beam sources have respective fields that overlap at the interface, the interface being a three-dimensional region, wherein the enlarged width area extends through the three-dimensional region of the interface.

17. The component of claim 11, wherein the interface-distant area and the enlarged width area each have a circular cross-sectional shape and the first and second width dimensions are diameters.

18. The component of claim 11, wherein the interface-distant area has a circular cross-sectional shape, and the enlarged width area has a substantially elliptical cross-sectional shape, a distance of each axis of the substantially elliptical cross-sectional shape being larger than the first width.

19. The component of claim 11, wherein the interface includes a plurality of interfaces in the body and the enlarged width area includes a plurality of enlarged width areas along a length of the channel, each enlarged width area spanning a respective interface of the plurality of interfaces.

\* \* \* \* \*